INVENTOR.
Joseph W. Wanner
BY
D. C. Staley
HIS ATTORNEY

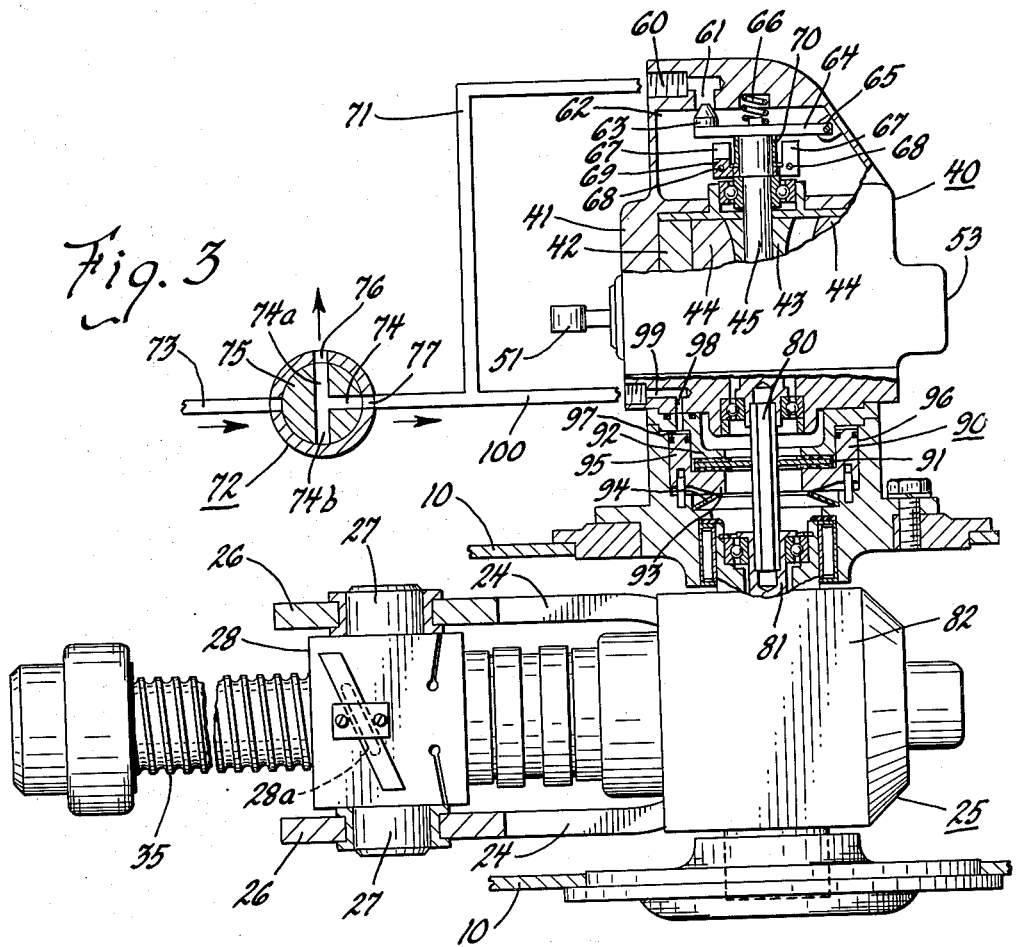
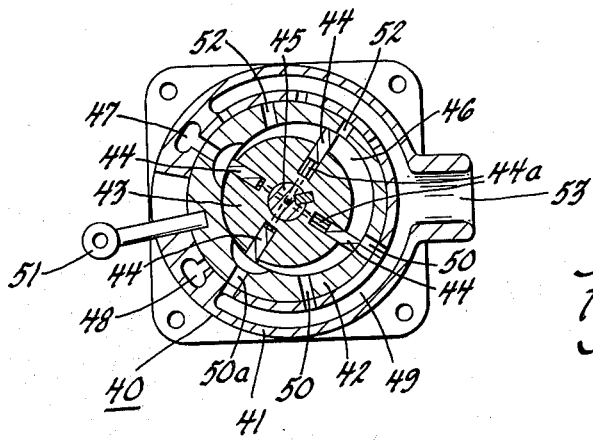
Fig. 3
Fig. 4
INVENTOR.
Joseph W. Wanner
BY
D. C. Staley
HIS ATTORNEY

3,002,469
SUSPENSION SYSTEM FOR VEHICLE HAVING ALTERNATE GROUND ENGAGING WHEEL SETS

Joseph W. Wanner, Dayton, Ohio, assignor to General Motors Corporation, Detroit, Mich., a corporation of Delaware Filed July 6, 1959, Ser. No. 825,137
5 Claims. (Cl. 105—215)

This invention relates to vehicles adapted for operation on either a railroad track system or on a highway road system, and particularly to a vehicle having one wheel system adapted to support the vehicle while moving over a railroad track and a second wheel system adapted to support the vehicle when operating on a highway.

Vehicles, such as large vans or railroad type cars have been developed so that the vehicle can be transported over a standard railroad track system and then when the vehicle reaches its destination the wheel system which transported the vehicle over the railroad track can be elevated with a second wheel system being lowered to support the vehicle for highway road travel and over the streets of any city.

Such vehicles are provided with dual wheel systems, one of which is a steel wheel system for support of the vehicle while moving over a railroad track and the second system is a rubber tire wheel system adapted to support the vehicle when operating the vehicle on a highway or street.

In vehicles of the type just described, it is necessary that the vehicle, as well as any load carried by the vehicle, be completely supported by the wheel system during a period of transfer from one wheel system to the other so as to convert the car or vehicle from one to operate on railroad tracks to one for operation on a highway system. Therefore, any mechanism constructed and arranged to bring the wheel system into a ground engaging position must also be capable of supporting the vehicle and the load contained in the vehicle.

It is possible to provide two complete independently actuating systems to bring the two wheel systems into engagement with the ground alternately and then to independently elevate the wheel system that will become inactive, but such dual actuating systems require expensive duplication of actuating devices for each of the wheel systems of the vehicle. To eliminate the necessity of duplication of actuating systems for the separate wheel systems of the car or vehicle, it has been proposed to support the wheel systems on a common carrier member and then oscillate the carrier about a support pivot axis so that one wheel system will maintain support of the vehicle while the other is being lowered into a ground engaging position, whereafter the wheel system that is to become inactive to support the car can be elevated to its nonground engaging position. However, during the course of transfer of the vehicle from support by one wheel system to a second wheel system, the weight of the car and its load must be entirely carried by the wheel system that is actively in ground engagement. Thus, when actuating the mechanism adapted for driving the wheel systems alternately into engagement with the ground, there is a period of time during the first part of the transfer period wherein the transfer mechanism must be capable of supporting the load of the vehicle without allowing it to drop suddenly, or free fall, although allowing the nonground engaging wheel system to be brought into engagement with the ground. Then, after the previous nonground engaging wheel system is brought into engagement with the ground the transfer mechanism must be capable of elevating the previous ground engaging wheel system into its inactive position and at the same time return the car, even though loaded, into its previous normal position relative to the ground.

Such an operation requires a transfer mechanism that can operate as a retarding or brake mechanism during the period of transfer when the nonground engaging wheel system is being lowered into ground engaging position, the car and its load at this time endeavoring to drive the nonground engaging wheel system into ground engagement since the transfer mechanism is effectively unlocked to allow pivotal or oscillation movement of the common carrier member of the wheel systems about its pivot axis. Otherwise, the car and its load would be provided with a free fall during the time the nonground engaging wheel is lowered into ground engaging position.

After the previous nonground engaging wheel system has been brought into ground engagement, the transfer mechanism must then be effective as a power driving mechanism to continue oscillation or rotation of the common carrier for the wheel systems about its axis to elevate the previous ground engaging wheel and also elevate the car and load to its previous elevated position relative to the ground.

It is therefore an object of this invention to provide a fluid motor in a dual wheel system and transfer mechanism of the type just described adapted to function as a retarding device or brake during the period of transfer in which the nonground engaging wheel system is being lowered into ground engaging position and then to be effective as a power driving motor to continue the transfer operation to elevate the other wheel system into nonground engaging position and re-elevate the load to its normal position relative to the ground.

It is another object of this invention to provide a fluid motor in a dual wheel system transfer mechanism wherein fluid pressure is continuously supplied to the fluid motor during the entire transfer operation to drive the motor, but wherein the pressure inlet side of the fluid motor contains a throttling control that throttles or closes off the inlet side of the fluid motor during the period of the transfer operation wherein the nonground engaging wheel is being moved into ground engaging position, whereby the fluid motor operates as a retarding device or brake during this period of the transfer operation, and when the previous nonground engaging wheel is in ground engagement the throttling device becomes ineffective to throttle or close off the inlet side of the fluid motor so that the fluid pressure being delivered to the motor will drive the same as a fluid motor to continue the transfer operation and elevate the previous ground engagement wheel system and re-elevate the car and load to its normal position relative to the ground.

It is another object of the invention to provide a fluid motor in a dual wheel transfer system of the type herein described wherein a throttling control is provided in the inlet side of the fluid motor which responds to the speed of the motor to prevent the motor from exceeding a predetermined speed value so that during the portion of the transfer operation in transferring the vehicle from one wheel system to the other, the load of the vehicle tending to drive the nonground supporting wheel system downwardly will drive the fluid motor, but only at its maximum speed allowed by the throttle control which throttles or closes off the fluid pressure inlet side of the motor when the vehicle tends to drive the motor at a speed above that regulated by the throttling device. The motor then functions as a retarding device or brake with fluid pressure supply being constantly available to drive the motor up to its maximum speed allowed by the throttle control, the fluid motor being effective as a drive motor up to the maximum speed allowed by the throttle control after the nonground engaging wheel system has been brought into ground engagement, the previous ground engaging wheel system then being power driven by the fluid motor into nonground engaging position with consequent elevation of the vehicle and load into its normal position relative to the ground.

Further objects and advantages of the present invention will be apparent from the following description, reference being had to the accompanying drawings wherein preferred embodiments of the present invention are clearly shown.

In the drawings:

FIGURE 3 is an elevational view partially in cross section of the driving mechanism for the transfer mechanism, including the fluid motor having a ball-nut screw actuator.

FIGURE 4 is a cross-sectional view of a fluid motor taken at right angles to the axis of the motor illustrating a typical fluid motor capable of use in this invention.

Figure 1:
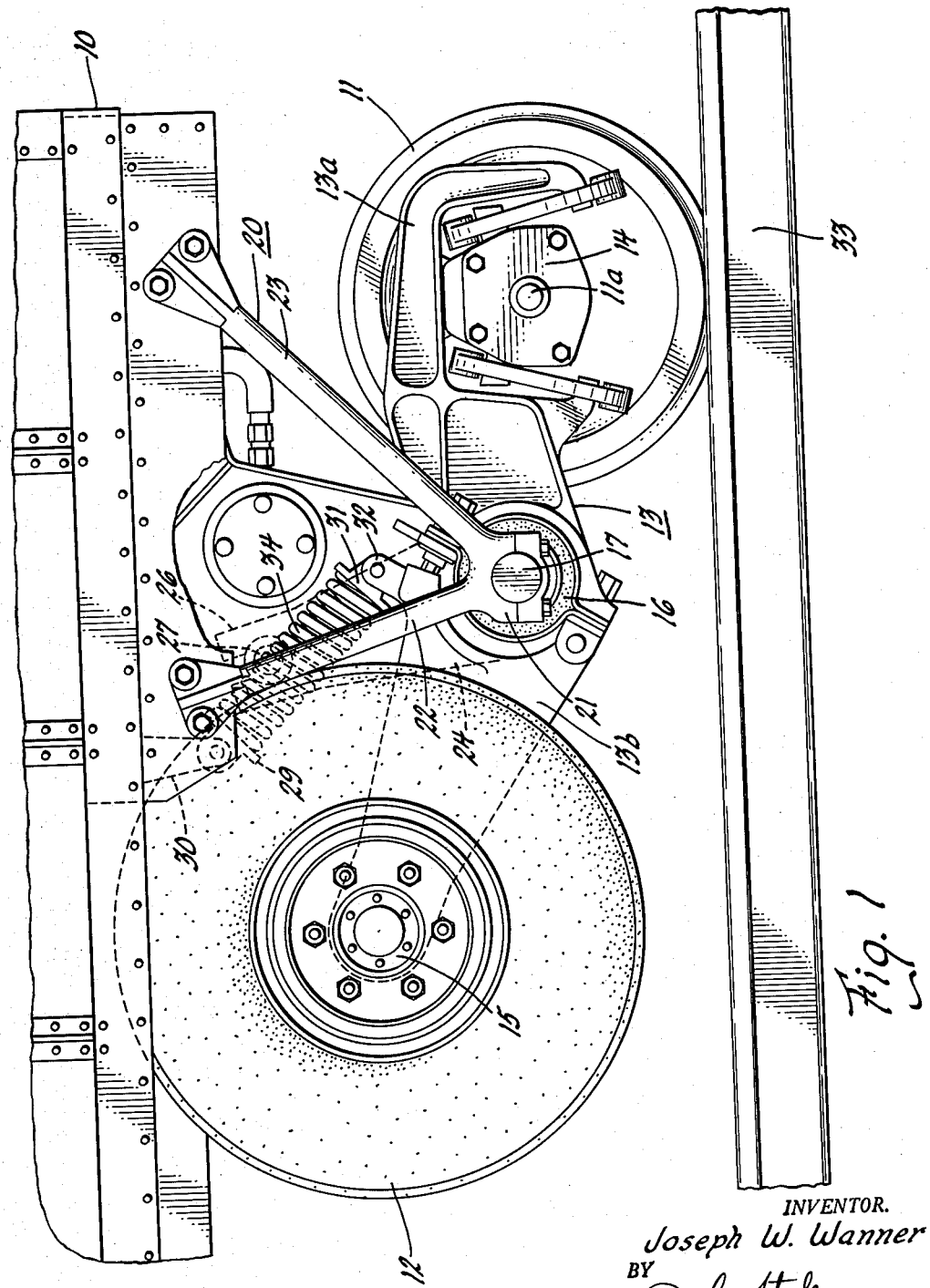
FIGURE 1 is a side elevational view of a part of a vehicle and a dual wheel system for the same supported on a common carrier in a manner that either wheel system can support the vehicle.
Figure 2:
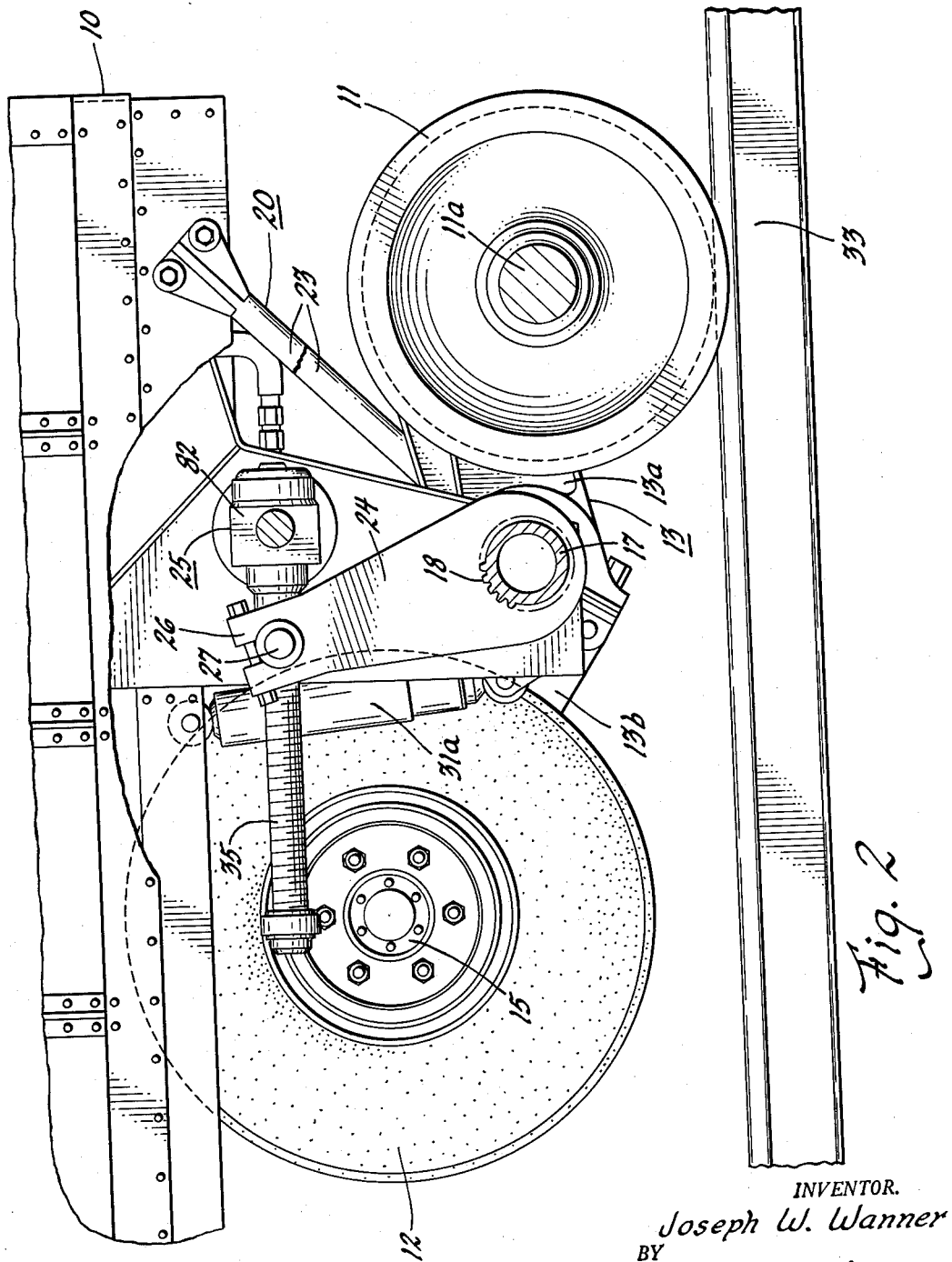
FIGURE 2 is a cross-sectional view taken longitudinally of the vehicle just to the rear of the wheel system illustrated in FIGURE 1, and therefore illustrates the wheel system on the opposite side of the vehicle with the transfer mechanism.

Referring to FIGURES 1 and 2, the vehicle involved in this invention has a frame 10 that supports the undercarriage for the vehicle. Specifically, the vehicle is a railroad car of substantially standard size and capacity provided with the dual wheel system hereinafter described. The railroad car is adapted to be assembled into regular trains for transporting the vehicles of a standard railroad system. When the railroad cars reach their destination, the regular steel rail wheels are elevated and a second wheel system lowered into ground engagement. The second wheel system comprises a plurality of rubber tired wheels for carrying the vehicle over a highway road system or the street system of cities. Thus, the vehicles are adapted to be assembled into regular trains for long-haul travel off of the highway system and then when the vehicles reach their destination they can be adapted for highway travel for delivery to various stores and factories for direct unloading.

The dual wheel system supported from the frame 10 of the vehicle comprises a first flanged steel wheel system 11, formed of conventional steel railroad wheels adapted for travel on standard railroad tracks, and a second pneumatic rubber tired wheel system 12 adapted to support the vehicle during highway and street travel.

The wheel systems 11 and 12 are supported on a common carrier 13 having forwardly extending support arms 13a and rearwardly extending support arms 13b. This main support structure includes a journal box 14 for the axle 11a of the steel wheel system 11 and a suitable anti-friction bearing structure 15 for support of the wheels 12 of the wheel system.

The main support on common support 13 includes a rubber torsilastic spring 16 that carries the support 13 on a central cross shaft 17. The springing for the wheel systems containing wheels 11 and 12 is accomplished by the torsilastic springs 16 that are mounted crosswise of the vehicle frame 10. These springs each consist of an inner steel tube and an outer steel shell with an intermediate rubber tube between the inner and outer steel shells that is vulcanized to both steel members. The rubber between the steel shells deflects in shear and acts as a torsional spring element. The torsilastic spring is not a part of the invention herein and is therefore not shown in detail.

The arms 13a and 13b that support the rail wheels 11 and the highway wheels 12 are secured to the outer steel shell of the springs. The inner steel shells of the springs are positioned on the centrally located splined shaft 17 having the splines 18 which positions the inner steel shell of the spring 16 stationary relative to the spline shaft 17, and therefore prevents rotation of the inner steel shell relative to the nonrotating shaft 17 so that the outer steel shell of the spring will produce the torsion effect in the intermediate rubber tube for resilient support of either the rail wheel 11 or the highway wheel 13 when in ground engagement. The stationary shaft 17 is journaled in a fork 20 having the journal portion 21 that supports the shaft 17 and the two arms 22 and 23 that secure the fork 20 to the frame 10 of the vehicle by any suitable means.

The shaft 17 is also splined to the actuating arm 24 that is held in a fixed spatial position by means of the ball-nut actuator 25, the arm 24 having the upper end 26 thereof supported in a trunnion 27 that is a part of the ball-nut 28 of the actuator 25, hereinafter described in more detail. Thus, normally the shaft 17 is held in a fixed nonrotatable position so that the rail wheels 11 and the highway wheels 12 will be retained in either their ground engaging positions or their nonground engaging positions depending upon the position of the wheel systems as selected and controlled by operation of the actuator 25. The shaft 17, however, is rotated in the journal 21 to allow for oscillation of the highway wheels 12 and the rail wheels 11 on the common carrier 13 about the axis of the shaft 17.

The spring 34 extends between a spring seat 29 supported on a bracket 30 on the frame 10 and the spring seat 31 supported on the extension 32 on the common carrier 13 and forms a part of an articulated lever system by which the travel of the rail wheels 11 into their elevated position can be greater than the movement of the highway wheels into their elevated position because of the different diameters of the wheels of the two wheel systems.

In FIGS. 1 and 2 the rail wheels 11 are illustrated as supporting the vehicle upon the rails 33 while the highway wheels 12 are in elevated position. With the highway wheels being retained against the bottom of the vehicle by means of the spring 34 and its associated articulated lever system to prevent the wheels 12 from any substantial effect in the effective operation of the torsion spring 16 when supporting the load of the car 10 by means of the rail wheels 11. A shock absorber 31a is placed between the frame 10 of the vehicle and the common carrier 13 by which vehicle movements relative to the wheels are snubbed.

The carrier 13 together with the shaft 17, the arm 24 and the actuator 25 including the fluid motor 40 with the ball-nut 28 that carries the trunnion 27 that is supported on the screw 35, provide a transfer system by which the highway wheels 12 can be lowered into ground engaging position while the rail wheels 11 are still in engagement with the rails, lowering of the vehicle and the highway wheels 12 being under control of the fluid motor 40 acting as a retarding device or brake, as hereinafter more fully described. When the highway wheels engage the ground, the transfer system becomes a driving system under power of the fluid motor 40 to elevate the rail wheels from the track.

The actuator 25 is more particularly illustrated in FIG. 3, including a part of the fluid motor 40, while the fluid motor 40 is more particularly illustrated in FIG. 4.

The fluid motor, in this instance being specifically an air motor, includes a housing 41 containing an oscillatable shiftable chamber member 42 in which a rotor 43 rotates to carry the vanes 44 about the axis of the driving shaft 45. The vanes are slidable in their respective vane slots and are retained in engagement with the pump cavity by means of pins 44a extending between oppositely acting vanes 44.

The fluid motor 40 has inlet chambers 47 and 48 and an exhaust chamber 49. As shown in FIGURE 4, the pump is positioned for chamber 47 to perform the function of inlet chamber while the ports 50 in the member 42 are aligned with corresponding ports in the housing 41 for discharge of air after driving the rotor in a clockwise direction, as viewed in FIG. 4.

The pump is reversible merely by shifting the member 42 in a clockwise direction by means of the member 51 to align port 50a with the chamber 48 and align ports 52 with corresponding ports in the member 41 to exhaust air delivered through port 50a from chamber 48 in the discharge chamber 49, the air exhausting through the main exhaust passage 53. The fluid pump illustrated is of a standard make so that further description of the motor is not believed necessary since the motor construction, per se, forms no part of this invention except insofar as the fluid motor, or air motor, provides the retarding or braking means for the transfer mechanism when a wheel system is being lowered into engagement with the ground and provides a power source to continue driving the carrier 13 thereafter to elevate the opposite wheel system.

The fluid motor 40 has a main inlet passage 60 that communicates with a port 61 which, in turn, supplies the chamber 62 with fluid under pressure, preferably air, so that the ports 47 and 48 provided in the casing 41 may deliver air under pressure into the rotor chamber 46 to effect rotation thereof in either direction depending upon the port 47 or 48 that is used as the inlet port to the rotor chamber.

The port 61 in the fluid motor 40 is adapted to be closed by a throttle control valve 63 that is pivoted to the casing 40 by means of an arm 64 pivoted at 65 and normally held in the position shown in FIG. 3 to maintain the port 61 open by means of the compression spring 66.

The throttle valve 63 can be moved into the port 61 to close the same by means of the flyweight members 67 pivoted at 68 on a carrier member 69 suitably keyed to the driving shaft 45 of the fluid motor 40. These flyweight members rotate about their pivots 68 to urge the inner ends thereof against the sleeve 70 that is slidable on the shaft 45 to move the throttle valve 63 toward the port 61 to close the same when the speed of rotation of the shaft 45 reaches a maximum desired value to regulate the speed of the fluid motor 40 to a predetermined value. The centrifugally operated governor formed by the members 67, 69 and 70 thereby functions to close the throttle valve 63 regardless of whether the fluid motor is being driven or whether it is driving.

The fluid motor 40 receives fluid under pressure, preferably air, through a supply line 71 connected with control valve 72 that, in turn, has the inlet connection 73 connected with a suitable source of high-pressure supply such as a reservoir tank carried on the vehicle supplied with air under pressure from a suitable compressor driven either electrically or from the axle of the vehicle. Since the air compressing system is conventional, it has not been illustrated herein. The valve 72 illustrated diagrammatically in FIG. 3 has three radial ports 74, 74a and 74b in the motor member 75 of the valve so that when the ports are in the position illustrated in FIG. 3 the inlet side of the fluid motor is connected to exhaust port 76, the inlet port 73 being closed off. Whenever the valve 72 is rotated clockwise, to align port 74a with the port 77 and port 74b with port 73, air under pressure will be supplied to the supply line 71 for delivery of air supply to the fluid motor 40. This valve 73 can be controlled manually or by remote control, as desired.

The fluid motor 40 has an output shaft 80 drivingly connected with an input shaft 81 of a speed reducing mechanism 82 that forms a part of the ball-nut actuator 25. The speed reducing mechanism contained in the housing for the same may be of any suitable type adapted to reduce the speed of the output shaft 80 to a somewhat lower speed to drive the screw 35 on which the ball-nut 28 is positioned. The nut 28 contains a spiral groove with a plurality of ball bearings filling a channel of the spiral groove of the screw 35 and a suitable ball passage 28a to provide for continuous recirculation of the ball bearings through the nut 28 on rotation of the screw 35 relative to the nut, thus driving the nut 28 from one end to the other of the screw 35.

Between the actuator 25 and the fluid motor 40 there is provided a brake or locking device 90 which normally prevents rotation of the output shaft 80 connecting the fluid motor 40 with the actuator 25 and thereby preventing rotation of the screw 35. Since the gear reduction between the shaft 80 and the screw 35 has a relatively high ratio, the braking force of a brake disk 91 is insufficient to prevent rotation of the screw 35, even though the nut 28 is under considerable axial pressure tending to drive the nut endwise on the screw. This axial pressure results in the actuator 25, and particularly the screw 35, being the strut between the frame 10 of the vehicle and the arm 24 of the transfer mechanism to hold the wheel systems in the position shown in FIGS. 1 and 2, or in their alternate position.

The brake 90 consists of the brake disk 91, previously mentioned, suitably keyed to the output shaft 80 of the fluid motor to rotate with rotation of the shaft 80. The brake disk 91 is normally clamped between the housing member 92 and a piston member 93 by means of a Belleville type spring 94 urging the piston upwardly, as viewed in FIG. 3. The piston 93 has the annular piston portion 95 axially movable in the annular slot 96 which forms a fluid chamber 97, specifically for air, which fluid chamber is connected with the source of fluid supply for the fluid motor through the passages 98 and 99 and the pipe line 100 with the supply line 71.

It will thus be seen that whenever air is supplied to the fluid motor inlet 60, by proper positioning of the rotor 75 of the valve 72, air will also be supplied to the chamber 97 to move the piston 90 downwardly, as viewed in FIG. 3, and thereby release the brake disk 91 so that it is free to rotate, thus unlocking the ball-nut actuator 25.

The operation of the device is as follows: Assuming the rail wheel system and the highway wheel system are in the position shown in FIGS. 1 and 2 whereby the vehicle 10 is supported upon the rail wheels 11 for rail travel, the brake disk 91 between the actuator 25 and the fluid motor 40 will be in its braking or locking position shown in FIG. 3, and the air valve 72 will be in the position shown in FIG. 3 so that the rail wheel system 11 will be locked in the position shown in FIGS. 1 and 2.

When the transfer mechanism is to be operated to shift the support of the vehicle 10 from the rail wheels 11 to the highway wheels 12, the air valve or fluid valve 72 will be rotated clockwise to align passage 74b with the inlet supply line 73 and port 74a with the port 77 for supply of fluid under pressure to the supply line 71 to drive the fluid motor or air motor 40 by means of delivery of air or fluid through chamber 47 into port 52 and thence into the rotor chamber 46 to rotate the driving shaft 45 under effect of power drive so long as air is supplied to the rotor chamber 46.

Concurrently, on rotation of the air valve 72, as hereinbefore mentioned, air is supplied to the chamber 97 of the brake mechanism 90 to move the piston 93 downwardly against the Belleville spring 94 and release the brake disk 91 to allow the brake disk to rotate freely.

With air being supplied to the fluid motor 40, as hereinbefore described, the motor 40 will drive the gear reduction mechanism 82 of the ball-nut actuator 25 to start movement of the highway wheels 12 downwardly by causing the nut 28 to move outwardly on the screw 35 of the actuator and rotate the carrier 13 for the dual wheel systems counterclockwise as viewed in FIGS. 1 and 2.

Such an operation would be perfectly satisfactory except for the fact that the vehicle 10 and the load carried thereby are supported on the rail wheels 11 which tend to drive the rail wheels counterclockwise about the axis of the shaft 17, rotating the shaft in the journals 21 of the fork arm 20. Considering the gross weight of the vehicle being well over 35,000 lbs. (not unusual for railroad cars), the vehicle 10 tends to free fall to rotate the rail wheels 11 about the axis of the shaft 17.

To prevent this free falling of the vehicle 10 during a period of time the brake is in unlocked condition and the highway wheels are moving downwardly, the fluid motor 40 acts as a retarding or braking device. Since driving effort by the vehicle on the rail wheels 11 tends to rotate the arm 24 of the transfer mechanism in a counter-clockwise direction to drive the nut 28 outwardly on the screw 35 and thus drive the fluid motor 40 through the gear reduction device 82, the fluid motor 40 rapidly reaches maximum speed of rotation for the rotor 43. This results in the flyweights 67 of the speed governing device being thrown out centrifugally to move the sleeve 70 of the device upwardly, as shown in FIG. 3, and thereby throttle the inlet port 61 to a closed condition. This cuts off the air supply to the rotor chamber 46 with the result the rotor vanes are drawing a vacuum in the normal inlet chambers and only sufficient air is allowed to pass into the rotor chamber 46 by way of the throttle control to prevent the rotor from exceeding a predetermined maximum speed.

This control of the maximum speed of the rotor of the fluid motor by admission of controlled quantities of air to the fluid motor results in the fluid motor 40 operating as a retarding or braking device. The vehicle 10 is therefore prevented from a free fall condition and is lowered by the transfer mechanism under control of the fluid motor 40 acting as a retarding device or brake until the highway wheels 12 engage the ground.

As soon as the highway wheels 12 engage the ground the driving effect of the weight of the vehicle on the fluid motor through the ball-nut actuator 25 stops. When the driving effect stops, the speed of the fluid motor 40 will reduce to allow the flyweight governor to open the throttle valve, spring 66 overcoming the effect of the flyweights 67. Thereafter, air continued in supply to the inlet side 60 of the fluid motor will positively drive the motor in the same direction as before to continue the rotation of the carrier 13, through movement of the arm 24 in a counterclockwise direction (see FIG. 2), until the rail wheels 11 are placed into a position comparable to that previously assumed by the highway wheels 12 at which time the air supply to the fluid motor 40 can be cut off by rotation of the valve 72 to the position shown in FIG. 3 to stop the motor and reapply the brake 90 to retain the highway wheels in ground engagement and the rail wheels in elevated position.

While the embodiments of the present invention as herein disclosed constitute a preferred form, it is to be understood that other forms might be adopted.

What is claimed is as follows:

1. A suspension system for a vehicle comprising, a carrier pivotally attached to said vehicle, a first and a second wheel mounted on said carrier at opposite sides of the pivot point, drive means associated with said carrier to alternately position said first wheel and said second wheel between an elevated position and a ground engaging position, said drive means including a fluid operated motor, and means operatively associated with said fluid operated motor to automatically control the lowering of an elevated wheel to thereby retard free fall movement of the vehicle.

2. A suspension system for a vehicle comprising, a carrier pivotally attached to said vehicle, a first and a second wheel mounted on said carrier at opposite sides of the pivot point, drive means associated with said carrier to alternately position said first wheel and said second wheel between an elevated position and a ground engaging position, said drive means including a fluid operated motor, first means for restricting the flow of fluid into said motor, and second means operatively associated with said first means to automatically control the latter to prevent said motor from exceeding a predetermined speed and thereby retard free fall movement of the vehicle during lowering of an elevated wheel into ground engagement.

3. A suspension system for a vehicle comprising, a carrier pivotally attached to said vehicle, a first and a second wheel mounted on said carrier at opposite sides of the pivot point, drive mechanism associated with said carrier to alternately position said first wheel and said second wheel between an elevated position and a ground engaging position, a brake for maintaining said carrier in a rigid state when either said first wheel or said second wheel is in a fully elevated position, said drive mechanism including a fluid operated motor, first means for restricting the flow of fluid into said motor, second means operatively associated with said first means to automatically control the latter to prevent said motor from exceeding a predetermined speed and thereby retard free fall movement of the vehicle during lowering of an elevated wheel into ground engagement and third means in said system permitting concurrent activation of said motor and release of said brake.

4. A suspension system for a vehicle comprising, a carrier pivotally attached to said vehicle, a first and a second wheel mounted on said carrier at opposite sides of the pivot point, drive mechanism associated with said carrier to alternately position said first and second wheel between an elevated and a ground engaging position, a fluid operated brake for holding said carrier in a fixed position when either said first or second wheel is in a fully elevated position, said drive mechanism including a fluid operated motor, first means for restricting the flow of fluid into said motor, second means engageable with said first means to automatically control the latter to prevent said motor from exceeding a predetermined speed and thereby retard free fall movement of the vehicle during lowering of an elevated wheel into ground engagement, and passage means for connecting said brake with said motor to permit concurrent activation of said motor and release of said brake.

5. A suspension system for a vehicle comprising, a carrier pivotally attached to said vehicle, a first and a second wheel mounted on said carrier at opposite sides of the pivot point, drive mechanism associated with said carrier to alternately position said first and second wheel between an elevated and a ground engaging position, said drive mechanism including a pressure fluid operated motor, means for restricting the flow of pressurized fluid into said motor, and a centrifugal governor driven by said motor and engageable with said last mentioned means to automatically regulate the latter to prevent said motor from exceeding a predetermined speed and thereby retard free fall movement of the vehicle during lowering of an elevated wheel into ground engagement.

References Cited in the file of this patent

UNITED STATES PATENTS

| | | |
|---|---|---|
| 1,938,049 | Serrano | Dec. 5, 1933 |
| 2,030,311 | Messick | Feb. 11, 1936 |
| 2,039,489 | Messick | May 5, 1936 |
| 2,889,785 | Browne | June 9, 1959 |
| 2,925,791 | Browne et al. | Feb. 23, 1960 |